Feb. 9, 1954 B. ROBERTS 2,668,718

MAGNETIC LETTERHEAD

Original Filed Dec. 21, 1946

INVENTOR
Bruce Roberts

BY Synnestvedt & Lechner
ATTORNEYS

Patented Feb. 9, 1954 2,668,718

UNITED STATES PATENT OFFICE 2,668,718

MAGNETIC LETTERHEAD

Bruce Roberts, Philadelphia, Pa., assignor to The International Electronics Company, Philadelphia, Pa., a corporation of Pennsylvania Original application December 21, 1946, Serial No. 717,754. Divided and this application March 27, 1947, Serial No. 737,693

3 Claims. (Cl. 274—41.4)

This invention relates to records for use in magnetic recording, and, more particularly, has to do with magnetic record sheets for use in magnetic recording equipment of the type disclosed in my copending application, Serial No. 717,754, filed December 21, 1946, of which this application is a division.

The art of recording intelligence, heretofore, has been subject to certain disadvantages or inconveniences, either with respect to the recording technique or with respect to the recording media employed. For example, writing and related arts, while using convenient media such as paper, are handicapped by the tremendous expenditure of time and effort which must intervene between the conceptualizing of thought and its ultimate recording in permanent form.

On the other hand, the direct methods of recording intelligence, as heretofore known, for example, mechanical inscription of phonograph records, the photochemical recording of sound on film, and magnetic recording on various forms of sheet metal records such as steel discs or drums or coated paper tapes, while adapted to record intelligence as rapidly as it is vocalized, are handicapped by the inconvenient nature of the media on which recordings of these varieties are inscribed. The bulky character of such records makes them inconvenient to store or file, and moreover, the frangible nature of the common mechanical phonograph records, whether of disc or cylindrical form, has become proverbial. The shape or weight of any of the previously known types of record, even magnetizable tape or sound film, renders impractical the mailing thereof. Because of these limitations, recordings heretofore made on such media have customarily been transcribed to typewritten form for the purposes of filing and mailing.

The primary object of the present invention is to provide a record medium which is suitable for instantaneous recording and which is also suitable for filing or mailing in accordance with techniques employed with ordinary typewritten letters.

I accomplish this by employing as a recording medium a rectangular, flexible sheet comprising magnetizable material, and capable of repeated creasing and uncreasing without detriment. The sheet in this form is as well adapted to storage or transmission, for instance filing or mailing, as the most satisfactory recording media known. According to the present invention, a sheet of the character described is temporarily flexed from its normal flat form to a form having a substantially continuous surface, preferably to the form of a cylinder. This continuous surface is then scanned by a magnetic recording device. Upon the completion of the recording operation, the sheet is restored to its former flat condition and filed or disposed of in other appropriate manner. It may be folded without detriment, and constitutes a permanent record of the matter inscribed thereon. When it is desired to reproduce the recording, the sheet is again flexed to form a continuous surface and again scanned in the same path as before, but now by a magnetic reproducing device.

According to the foregoing, it will be seen that the invention contemplates a highly novel record medium capable of assuming one form during storage or transmission and another form during recording and reproduction.

Another object of the invention is a record sheet which is adapted to be repeatedly inserted in and withdrawn from a magnetic recording device.

According to another aspect of the invention, a portion of the record sheet is adapted to interengage with an element of the recording equipment, to reestablish and maintain, at the time of reproduction, the orientation of the sheet relative to the machine which existed at the time of recording.

Turning now to the drawings.

Figure 1:
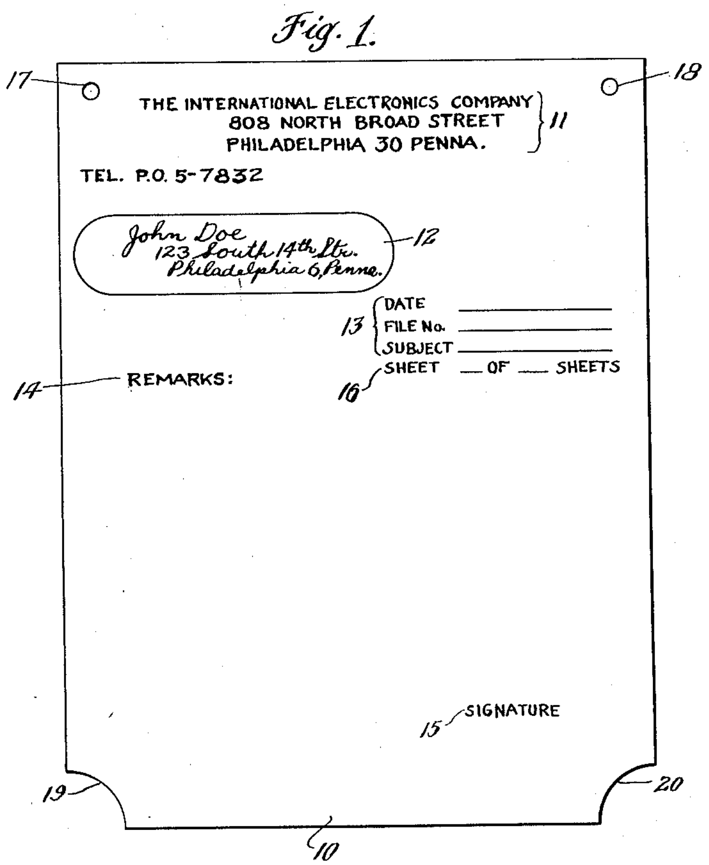
Figure 1 is a plan view of a record sheet prepared in accordance with the invention.

Considering now the drawings in detail, Figure 1 is a plan view of a recording sheet 10, bearing on its uncoated side a letterhead 11, space for address 12, classification indicia 13, a heading 14, and signature location indicia 15. The address space is defined by a box, providing a reference for registration of an address with the window of a standard window envelope.

In records whose context is not visually comprehensible, it is especially important to provide means for indicating the relative order and number of the sheets comprising a multi-sheet record, and to that end, I have provided means 16 for indicating the position of each sheet in such a series.

The record sheet may be of any convenient size, but preferably should be of standard letter size, for example, 8½" by 11". By standardizing on this size and shape of record sheet, all the auxiliary equipment of letter communication becomes available; for example, standard envelopes, standard file folders, standard file cabinets, and the like may advantageously be employed for storage and handling of record sheets of this size.

In addition to the dimensions, the plan form of the sheet is characterized by holes 17 and 18 and notched corners 19 and 20, which together cooperate in maintaining the record sheet in scanning position in the recording apparatus, as will appear more fully hereinbelow.

Figure 2:
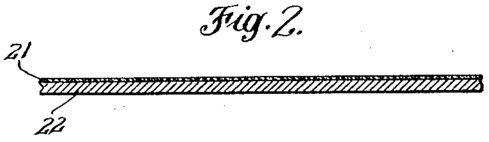
Figure 2 is a fragmentary sectional view of the record sheet of Figure 1.

As shown in the sectional view of Figure 2, the sheet 10 comprises a recording layer 21 made up of particles of magnetizable material dispersed in a suitable binder. The recording layer is preferably supported by a flexible backing 22.

Backing member 22 comprises a highly flexible, resilient material, such as paper, characterized by great resistance to cracking upon folding and creasing, and the ability to assume a substantially flat form after flexure to a closed loop or after creasing. The binder for the magnetizable particles has similar properties, and therefore a record medium made in accordance with the invention is capable of repeated flexing to cylindrical form and of repeated creasing and uncreasing without disturbance of the bond between the magnetizable material and the backing member, and without interference with the orientation of the individual magnetizable particles in relation to each other. The resilience of the material operates to restore it to flat form as it is released from the cylinder, which is not only advantageous for purposes of ultimate disposition, but also aids in removing the sheet from the machine, as will appear.

I have found that the best combination of the properties above discussed is obtained with a sheet of from about one to about five thousandths of an inch in thickness, and most desirably, with sheets from two to three thousandths of an inch thick.

Figure 3:
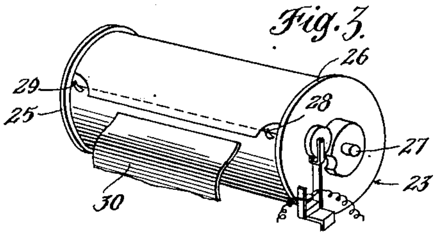
Figure 3 is an isometric view of the record sheet of the invention mounted in recording position upon the record support of a dictation machine.

During recording and reproduction a sheet 10 may be supported upon a cylindrical form such as is generally indicated at 23 in Figure 3. Cylinder 23 comprises a barrel 24 of non-magnetic material, for example, brass, and two end flanges 25 and 26, the diameter of the flanges preferably being slightly greater than that of the barrel 24. Cylindrical form 23 may be mounted upon a shaft such as 27 which protrudes beyond flanges 25 and 26 at either end. Form 23 is provided with a pair of hooks 28 and 29 projecting from barrel 24 near the ends thereof in the same radial plane and adapted to engage holes 17 and 18 in sheet 10.

As is set forth in my copending application above identified, the circumference of the barrel should be no greater than the length of sheet 10 and preferably should be somewhat less than the length of the sheet in order to provide for a slight overlap when the sheet is wrapped around the barrel. In the preferred form of the invention, standardized on the basis of 8½" by 11" paper, the circumference of the cylinder may advantageously be approximately 10½". Under these circumstances, notches 19 and 20 permit the paper to lie flat without interference from hooks 28 and 29, even through the notched or bottom end of the sheet overlaps the opposite end.

As is also set forth in my copending application, when it is desired to remove a record from the drum, the drum is rotated to a predetermined position and stopped by mechanism therein disclosed, preferably arranged to stop the cylinder when the trailing edge of sheet 10 is somewhat past the edge of a stripping element 30 (see Figure 4) which strips the sheet from the drum on reverse rotation thereof. Since the sheet has a natural tendency to straighten out, it will peel off outside member 30 and be projected tangentially in substantially unflexed form from drum 23.

As is more fully set forth in my copending application above identified, the recording and reproducing equipment includes means for effecting movement of a recording head relative to the record medium in two directions substantially normal to each other. The interrelation of these two components makes possible the scanning of the entire record area in a series of side-by-side track portions. Preferably, the two components are interrelated in a manner to provide for simultaneous translational and rotational movement whereby to provide for a continuous helical track intersecting the line of overlapping of the opposite edges of the record sheet.

Figure 4:
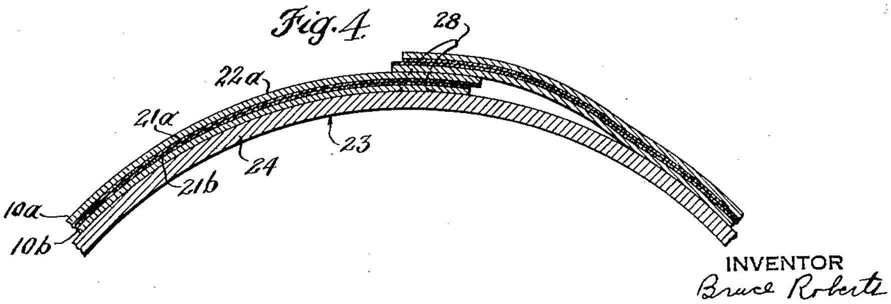
Figure 4 is a sectional view, on an enlarged scale, of a pair of sheets superimposed on a form in position to be simultaneously recorded.

I have also described, in my copending application, a method and apparatus for simultaneously recording on two record sheets. A pair of record sheets 10*a* and 10*b* made in accordance with this invention, is mounted upon a barrel 24 of a cylindrical form 23, with their coated surfaces 21*a* and 21*b* in juxtaposition, as illustrated in Figure 4. The two sheets are secured to form 23 in the usual manner by hooks 28 and 29, which penetrate holes 17 and 18. The recording is made through backing portion 22*a* of the outside sheet 10*a*. It should be pointed out that this technique depends upon the maintenance of positive alignment as between the two record sheets throughout the entire process. The method of securing the sheets to each other and to the cylinder, illustrated in the figure, by means of the interengaging hooks 28 and 29 and holes 17 and 18 results in effectively maintaining this alignment. While I have found that the innermost layer is recorded at a somewhat lower level than the outer layer, this is of small consequence, since the level of reproduction may be controlled within wide limits by adjustment of the volume control of the reproducing equipment, and therefore, as will be understood, the second recording is eminently satisfactory as a file copy.

Thus, the invention provides for the immediate reduction of intelligence to a form of permanent record which is not only adapted to convenient transcription to some other form of record, but is also highly suited to storage or transmission without further effort on the part of the person with whom it originated.

I claim:

1. A recording medium comprising a flexible rectangular sheet carrying particles of magnetizable material, the said sheet being provided with securing means adapted to cooperate with complementary securing means on a cylindrical form of circumference less than the length of the sheet, said first mentioned securing means being located near one edge of the sheet, and the edge of the sheet opposite the first mentioned edge being cut out to provide for overlapping of said two edges without interference with the said complementary securing means when the sheet is wrapped around the form.

2. A record adapted to the recording of intelligence, comprising a thin, flexible sheet of generally rectangular shape carrying particles of magnetizable material and having two means adapted to interengage with driving mechanism for the record, said two means being located adjacent the corners of the sheet at the ends of one edge thereof, and the two corners of the sheet at the two ends of the opposite edge being notched to clear said means when the record is flexed to tubular form with said one edge and the opposite edge overlapped.

3. A recording medium comprising a rectangular record sheet carrying particles of magnetizable material and adapted to be temporarily flexed to cylindrical form with a first edge overlapping an opposite edge thereof during recording and reproducing, the sheet comprising means adapted to cooperate in maintaining the sheet in said cylindrical form, for distinguishing said first edge from said opposite edge, and for distinguishing one surface of said sheet from the other, said means including a perforation disposed adjacent said opposite edge, a truncated corner adjacent said first edge, and printed indicia on one surface thereof, one of said means being asymmetrically disposed relative to an axis of the sheet.

BRUCE ROBERTS.

References Cited in the file of this patent

UNITED STATES PATENTS

| Number | Name | Date |
|---|---|---|
| 406,568 | Edison | July 9, 1889 |
| 1,146,387 | Aylsworth | July 13, 1915 |
| 1,949,840 | Languepin | Mar. 6, 1934 |
| 2,043,884 | Crudo | June 9, 1936 |
| 2,152,296 | Weis et al. | Mar. 28, 1939 |
| 2,229,293 | Huntley et al. | Jan. 21, 1941 |
| 2,258,106 | Bryce | Oct. 7, 1941 |
| 2,427,383 | Bryce | Sept. 16, 1947 |

FOREIGN PATENTS

| Number | Country | Date |
|---|---|---|
| 394,810 | Great Britain | July 6, 1933 |
| 783,581 | France | Apr. 8, 1935 |